United States Patent
Bernaert et al.

(10) Patent No.: US 12,245,607 B2
(45) Date of Patent: Mar. 11, 2025

(54) PROCESS TO EXTRACT COMPONENTS OF CACAO POD HUSKS AND TO UTILIZE CACAO FRUIT SOLUBLE EXTRACT OBTAINED THEREOF AND ITS APPLICATIONS

(71) Applicant: Cabosse Naturals NV, Halle (BE)

(72) Inventors: Herwig Bernaert, Halle (BE); Gabi Kopp, Munich (DE)

(73) Assignee: Cabosse Naturals NV, Halle (BE)

( * ) Notice: Subject to any disclaimer, the term of this patent is extended or adjusted under 35 U.S.C. 154(b) by 753 days.

(21) Appl. No.: 17/268,676

(22) PCT Filed: Aug. 19, 2019

(86) PCT No.: PCT/EP2019/072186
§ 371 (c)(1),
(2) Date: Feb. 16, 2021

(87) PCT Pub. No.: WO2020/038905
PCT Pub. Date: Feb. 27, 2020

(65) Prior Publication Data
US 2022/0046943 A1    Feb. 17, 2022

(30) Foreign Application Priority Data
Aug. 20, 2018 (EP) ..................... 18189816

(51) Int. Cl.
| A23G 1/00 | (2006.01) |
| A23C 9/13 | (2006.01) |
| A23C 9/156 | (2006.01) |
| A23G 1/02 | (2006.01) |
| A23G 1/56 | (2006.01) |
| B01D 21/26 | (2006.01) |
| B01D 61/14 | (2006.01) |

(52) U.S. Cl.
CPC .......... *A23G 1/0006* (2013.01); *A23C 9/1307* (2013.01); *A23C 9/156* (2013.01); *A23G 1/02* (2013.01); *A23G 1/56* (2013.01); *B01D 21/262* (2013.01); *B01D 61/145* (2013.01); *A23V 2002/00* (2013.01)

(58) Field of Classification Search
CPC ...... A23G 1/0006; A23G 1/56; A23C 9/1307; A23C 9/156; A01D 21/262; A01D 61/145
See application file for complete search history.

(56) References Cited

U.S. PATENT DOCUMENTS

| 4,156,030 A | 5/1979 | Eggen |
| 2004/0052910 A1* | 3/2004 | Nakamura .......... C08B 37/0057 426/482 |
| 2009/0269439 A1 | 10/2009 | Moulay |
| 2011/0151098 A1 | 6/2011 | Chronopoulos |

FOREIGN PATENT DOCUMENTS

| EP | 1107726 B1 | 6/2001 | |
| EP | 1352570 A1 | 10/2003 | |
| EP | 1728434 A1 | 12/2006 | |
| EP | 1733624 A1 | 12/2006 | |
| EP | 1352570 B1 * | 2/2008 | ............... A21D 2/36 |
| EP | 1886578 A1 | 2/2008 | |
| GB | 2223944 A | 4/1990 | |
| JP | H02167036 A | 6/1990 | |
| JP | 4064606 B2 | 3/2008 | |
| WO | 2003009707 A1 | 2/2003 | |
| WO | 2020038905 A1 | 2/2020 | |

OTHER PUBLICATIONS

Kowalska et al., "The influence of ingredients distribution on properties of agglomerated cocoa products". Journal of food engineering. 68 (2005) 155-161. (Year: 2005).*
ISR-WO for PCT/EP2019/072186 (parent to present application) dated Nov. 19, 2019.
Serra Bonhevi et al; "Composition of Dietary Fibre in Cocoa Husk;" Z Lebensm Unters Forsch A; 207:105-109; Jan. 1, 1998.
Elena Lecumberri et al; "Dietary Fibre Composition , Antioxidant Capacity and Physico-Chemical Properties of a Fibre-Rich Product from Cocoa;" Food Chemistry, vol. 104, No. 3, Jan. 1, 2007.

* cited by examiner

*Primary Examiner* — Donald R Spamer
*Assistant Examiner* — Assaf Zilbering
(74) *Attorney, Agent, or Firm* — Vorys, Sater, Seymour and Pease LLP

(57) ABSTRACT

The present invention relates to a method for optimizing the full utilization of cacao pod husks comprising the steps of debacterizing the pod surface and opening cacao the pods, separating the cacao pod husks from, cacao pulp, cacao placenta, cacao beans and cacao bean hulls, and drying separated cacao pod husks wherein separated and dried cacao pod husks are further processed by a method comprising the steps of a) grinding the cacao pod husks; b) optional acid extraction; c) a first enzymatic treatment; d) alkaline solubilization; e) a first decantation with centrifuge; f) ultrafiltration; g) acid extraction; h) a second decantation with centrifuge; i) a second enzymatic treatment; j) ultrafiltration and extract purification; k) concentration of the extract; l) drying of the concentrated extract. The invention also relates to extracts and compositions obtained thereof and their applications.

8 Claims, No Drawings

PROCESS TO EXTRACT COMPONENTS OF CACAO POD HUSKS AND TO UTILIZE CACAO FRUIT SOLUBLE EXTRACT OBTAINED THEREOF AND ITS APPLICATIONS

FIELD OF THE INVENTION

The present invention relates to methods for the optimization for the full utilization of cacao byproducts such as cacao pod husks. In a second aspect, the invention relates to products obtained by complete utilization of said cacao byproducts. In a third aspect, the present invention relates to applications of obtained products.

BACKGROUND

*Theobroma cacao* L., also known as a cacao tree, is a small tree in the family Malvaceae. A cacao tree produces about 20 usable pods a year. The cacao pods contain seeds, also known as cacao beans, surrounded by pod husks, placenta and pulp. The cacao seeds are used as cacao mass, powder or butter in various food applications. Given the value and great demand of the cacao seeds, the harvesting and processing of cacao is mainly focused on minimizing damage to the cacao seeds, while very little care and attention is paid to the pulp, placenta and pod husks surrounding the seeds. Traditionally, cacao pods are removed from the trees and are immediately cut in half using machetes. The seed bunch is saved, while the husk and stem are discarded.

Despite the importance of cacao as an agricultural export commodity, only approximately 10% of the gross weight of cacao pod is utilized for cacao mass, cacao powder and cacao butter production, while the majority of the total pod weight (cacao pulp, cacao placenta and cacao pod husks) is discarded as cacao waste.

Cacao pulp typically contains 80-90% water, 10-15% sugar, 0.4-2.0% citric acid, 1% pectin and other constituents including pentosans and polyphenols. Cacao pulp is generally rich in fermentable sugars, such as glucose, fructose and sucrose, and has a low pH of 3.0-3.5, mainly because of the presence of citric acid, which makes cacao pulp a suitable medium for microbial growth. For this reason, cacao pulp is conventionally used to assist fermentation of cacao beans.

Cacao placenta represents another byproduct of cacao beans. Still, utilizations of cacao placenta were only reported to a limited extent. FR 2 828 379 discloses partial utilization of cacao placenta together with cacao pod husks and the juice extracted from cacao beans for nutritional compositions. Said placenta and cacao pod husks were used fresh or dried, according to the invention.

However, utilization attempts in the field of confectionery applications have never been successful, since cacao placenta was shown to be a more expensive raw material than sugar beet, sugar cane, or other sources of glucose and fructose.

Cacao pod husks represent the biggest part of cacao byproducts obtained during cacao bean production. For each ton of dried beans produced, about 16 tons (on a fresh weight basis) of cacao pod husks are left to decompose in plantations, thereby representing a serious disposal problem. The proportion of the cacao pod husk in the pod mass is in the range 68-75 wt %. Therefore, efforts have been made to convert the husk into a beneficial byproduct. The relatively high potassium content allows partial utilization of cacao pod husks as a soil fertilizer. However, rotting pods rapidly become a source of infection with microorganisms such as black pod rot. Therefore, most of the cacao pod husks are burned or buried.

U.S. Pat. No. 4,206,245 discloses a nutritious animal feed comprising expressed cacao fruit flesh, especially for small animals. This invention discloses the utilization of the parenchymatous part of cacao pod husks (pressed as cacao flesh juice or utilization as such) after the removal of the outer peel and/or without removal of the outer peel of said cacao pod husks. Said parenchymatous part is used as a source of a hydrocolloid which is an emulsifying, stabilizing, suspending agent and protective hydrocolloid. The obtained cacao flesh juice is characterized by a high stabilizing effect, a capability of binding water, high viscosity when added to products, and improved rheological properties. Disclosed applications relate to various types of food.

Another way to utilize cacao husks is to use them as a source of insoluble and soluble fiber. Insoluble fiber such as cellulose, hemicellulose and lignin represent on average 60-70% of total fiber in cacao husks.

Pectin is a water soluble fiber and complex polysaccharide found naturally in higher plants. Pectin consists of mainly galacturonic acid units linked by $\alpha$-(1→4) linkages.

Pectin is widely used for its gelling properties in food, cosmetic and pharmaceutical industries. In the food industry, pectin is extracted mainly from byproducts such as citrus peel, apple pomace and sugar beet pulp.

Several studies disclosed the utilization of the cacao pod husks as a source of pectin.

Chan & Choo, Food Chemistry, 2013, 141, 3752-3758, discovered that temperature, extraction time and substrate-extractant ratio affected the yields, galacturonic acid contents, degrees of methylation (DM) and degrees of acetylation (DA) of the pectin obtained from cacao pod husks.

The above-mentioned disclosures are only aimed at the partial utilization of the byproducts related to cacao bean production. Furthermore, the obtained byproducts have a very limited use in the food industry. Some of the disclosed processes are characterized by using non-green extraction solvents or costly extraction conditions, which limit their industrial applicability.

The present invention aims to resolve at least some of the problems related to the efficient and useful processing of cacao byproducts. The invention aims to provide an efficient utilization of cacao byproducts for multiple purposes.

SUMMARY OF THE INVENTION

The present invention and its embodiments serve to provide a solution to one or more of the above-mentioned problems referred to an excessive cacao byproducts waste. The aim of the present invention is the complete utilization of cacao byproducts such as cacao pod husk. The present invention aims to discover a green, low-cost and efficient industrial process, avoiding the use of organic solvents to extract nutritional components of cacao byproducts.

In a first aspect, the present invention is directed to a method for optimization of the full utilization of cacao pods, by processing cacao pod husks separated from cacao pulp, cacao placenta and cacao beans. The method for optimizing the full utilization of cacao pod husks comprises the steps of debacterizing the pod surface and opening cacao the pods, separating the cacao pod husks from, cacao pulp, cacao placenta, cacao beans and cacao bean hulls, and drying separated cacao pod husks wherein separated and dried cacao pod husks are further processed by a method comprising the steps of a) grinding the cacao pod husks; b)

optional acid extraction; c) a first enzymatic treatment; d) alkaline solubilization; e) a first decantation with centrifuge; f) ultrafiltration; g) acid extraction; h) a second decantation with centrifuge; i) a second enzymatic treatment; j) ultrafiltration and extract purification; k) concentration of the extract; l) drying of the concentrated extract.

To this end, the present invention relates to the utilization of the discarded cacao pod husks to obtain a water soluble cacao pod husk extract of a high yield. The methods of the invention have further advantages such as minimal processing times and minimal use of organic solvents and other environmentally harmful chemicals. Thus, products that comprise the cacao pod husk extract of the present invention are clean label products. In particular, the method as described herein enables the preparation of cacao pod husk extract enriched in water soluble fiber and protein hydrolysates, wherein said extract is produced in a process comprising multistep refining and enzymatic/chemical treatment of said cacao pod husks.

The term "cacao pod husk", as used herein, means the outer peel i.e. husk of cacao fruit, substantially devoid from cacao beans, cacao bean hulls, cacao pulp and placenta. In intact cacao pods (fruit), cacao pod husks encapsulate cacao beans, cacao bean hulls, mucilaginous cacao pulp and placenta. Typically, cacao fruit is cut open to separate the cacao pod husk from cacao bean, cacao bean hull, cacao pulp and placenta, which are collected and further used in chocolate production. Cacao pod husks are typically discarded, and, as such, represent the most abundant by-product in chocolate production.

The term "cacao placenta", as used herein, means the extension of the stem inside the fruit.

The term "water soluble fiber", as used herein, means the sum of the water soluble carbohydrate and carbohydrate components, including pentosans, gums, pectins hemicellulose degradation products etc. Soluble dietary fiber provides the bulking effect commonly associated with fibers.

The term "hydrolysate", as used herein, means a product of an enzymatic degradation of certain substance, such as protein, polysaccharide, etc.

Preferred embodiments of the process are shown in claims 2-8. The preferred embodiments enable the total utilization yield to be higher than 80 wt %, preferably higher than 85 wt % and most preferably higher than 90 wt % calculated on a dried cacao pod husk weight.

In a second aspect, the present invention is directed to the cacao pod husk extract obtainable from cacao pod husks.

Cacao pod husks represent about three quarters of the weight of cacao pods, so they can be utilized as a cheap and abundant source for dietary fiber, protein and polyphenols. The cacao pod husk extract obtained according to the present invention, comprises water soluble fiber such as pectin that is a suitable stabilizing, thickening and gelling agent for the food industry, xylooligosaccharides with prebiotic properties, galactomannans with gelling properties and glucomannans suitable for use in dietetic food compositions. The cacao pod husk extract obtained according to the present invention also comprises proteins, peptides and other protein hydrolysates of a high nutritional value. Furthermore, the cacao pod husk extract of the invention is a good source of polyphenols.

The nutritional compositions obtained from cacao byproducts according to the present invention are particularly suitable for confectionery products such as chocolate, as dietary fiber sources, texturizers and stabilizing agents and replacements for cocoa powder.

DETAILED DESCRIPTION OF THE INVENTION

The present invention concerns solving some of the problems related to the optimization for the full utilization of cacao byproducts, in particular cacao pod husks. The present invention discloses optimized processes for full utilization of the cacao byproducts such as cacao pod husks to obtain nutritional extracts by employing green and low-cost industrial extraction methods. The present invention discloses the chemical compositions of the extracts obtained by such methods.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise.

"Comprise", "comprising" and "comprises" and comprised of" as used herein are synonymous with "include", "including", "includes" or "contain", "containing", "contains" and are inclusive or open-ended terms that specify the presence of what follows e.g. component and do not exclude or preclude the presence of additional, non-recited components, features, elements, members, steps known in the art or disclosed therein.

Furthermore, the terms first, second, third and the like in the description and in the claims, are used for distinguishing between similar elements and not necessarily for describing a sequential or chronological order, unless specified. It is to be understood that the terms so used are interchangeable under appropriate circumstances and that the embodiments of the invention described herein are capable of operation in sequences other than those described or illustrated herein;

The expression "% by weight", "weight percent", "% wt" or "wt %", here and throughout the description unless otherwise defined, refers to the relative weight of the respective component based on the overall weight of the formulation.

Reference throughout this specification to "one embodiment" or "an embodiment" means that a particular feature, structure or characteristic described in connection with the embodiment is included in at least one embodiment of the present invention. Thus the appearance of phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the terms "cacao" and "cocoa" are both often used to refer to the same items. For example, cacao beans are often referred to as "cocoa" beans. In the present application, the term "cacao" is generally used to refer to the used materials originating from *Theobroma cacao*.

The term "cacao pod" refers to a cacao fruit, which comprises cacao pod husks, cacao pulp, cacao placenta and cacao beans.

The term "acidity", as used herein, means the pH range from pH 7.0 and below.

The term "extracting" refers to the process of extracting soluble cacao components from a starting material, herein cacao byproducts. In certain embodiments of the present invention, the term "extracting", "solubilising", "recuperating" or "making soluble" are used as synonyms. The term "solubilisation" in this context thus refers to a process of solubilising a soluble component from a starting material, herein cacao byproducts.

The term "soluble", as used herein, means that product, extract or composition which is "soluble" has a solubility in an aqueous solvent at a temperature of 20° C. of at least 50%.

The term "protein" refers to proteins, polypeptides and their hydrolysates, such as peptides and amino acids.

The term "protein content" refers to content of proteins, polypeptides and their hydrolysates, such as peptides and amino acids.

The present invention relates to the finding that the "extraction" and "solubilisation" of cacao byproducts constituents can be increased by a process of applying different techniques, including a combination of enzymatic treatment, pH treatment under increased pressure, and temperature treatment. It further relates to the finding that the enhanced extraction of cacao byproducts constituents can be increased by a process whereby the different techniques including enzymatic treatment, pH treatment, temperature treatment and the like are applied.

In certain embodiments of the present invention, the terms "solubilisation" and "yield" are used as synonyms. A solubilisation or yield of 70% for instance indicates that 70% of the cacao components present in a starting material (a cacao byproduct) are solubilised or are already soluble and are recuperated in accordance with a method according to the invention.

The current invention is directed to an optimized method for full utilization of cacao fruit pods comprising the steps of debacterizing the surface of cacao pods, opening said pods and separating cacao pod husks from cacao pulp, cacao placenta, cacao beans and cacao bean hulls.

In a first aspect, the present invention concerns a process for optimizing the full utilization of cacao pod husks comprising the steps of debacterizing the pod surface and opening cacao pods, separating the cacao pod husks from cacao pulp, cacao placenta and cacao beans and cacao bean hulls, and drying separated cacao pod husks wherein separated and dried cacao pod husks are further processed by a method comprising the steps of a) grinding the cacao pod husks; b) optional acid extraction; c) a first enzymatic treatment; d) alkaline solubilization; e) a first decantation with centrifuge; f) ultrafiltration; g) acid extraction; h) a second decantation with centrifuge; i) a second enzymatic treatment; j) ultrafiltration and extract purification; k) concentration of the extract; l) drying of the concentrated extract.

After the shredding of the cacao pod husks to cacao pod husk flakes of a uniform size, the product is conveyed into a batch or continuous dryer applying temperatures below 60° C., preferably below 50° C. for about 6 hours, preferably less than 3 hours. The time and temperature is dependent on the dryer capacity and performance of the dryer. The drying temperature and time is limited to avoid the deterioration of the taste of the product, as well as the polymerization phenolic compounds.

The dried and shredded cacao pod husks were subjected to extraction processes using solvents, such as, but not limited to water, ethanol, methanol, isopropanol, hexane, ether, ethyl acetate, acetonitrile or any other suitable solvent or combination thereof. The extraction process of the invention is done as the single- or multi-step extraction process. In one embodiment, the extraction was performed as a single step process using mixture of ethanol and water (70:30%, v/v, respectively). In another embodiment, the extractions were performed as a single step process, using hexane as a solvent. In another embodiment, the single-step extraction process was conducted using the mixture of hexane (30%) and 70% of mixture of solvents of ethanol and water (70%:30%, v/v, respectively). In another embodiment, the extraction was carried out as a multi-step process using 30% hexane and 70% of mixture of ethanol and water (70%:30%, v/v, respectively). The extraction is additionally enhanced by a pre-treatment step such as ultrasonic system, microwave system, dynamic cavitation, electrical field treatment, combiflash fractionation (streamlined flash and preparative HPLC chromatography in one compact), or any other cell tissue destructing process. In the preferred embodiment, dry cacao pod husks are extracted using water extraction process, in particular by sub-critical water extraction. In a further preferred embodiment, the extraction processes are combined with mechanical treatment, such as, but not limited to high pressure, microwave treatment, ultrasonic treatment, dynamic cavitation.

Any pH modifying agent can be used to enhance solubilization process. Such pH modifying agent can be any acid or base or buffer, such as, but not limited to hydrochloric acid, citric acid, acetic acid, sodium hydroxide, potassium hydroxide, potassium carbonate and the like. In a particularly preferred embodiment, the cacao pod husk material is subjected to optional acid extraction, in order to extract pectin followed by the alkaline extraction in combination with suitable enzymatic treatment to extract a fraction enriched in proteins, polyphenols and other soluble fibers. By optimization of the pH it is possible to maximally utilize cacao pod husks for production of phytochemically rich extracts. Cacao pod husks represent the major part of cacao fruit pod and are normally discarded after being split from cacao pulp, cacao placenta, cacao beans and cacao bean hulls. Cacao pod husks are of a unique phytochemical profile. It was not possible to fully utilize the phytochemical constituents of cacao pod husks using the processes in the prior art, mainly due to a high content of insoluble fibers. The process of the invention surprisingly allows for a maximal extraction of valuable cacao pod husk phytochemical constituents, such as proteins, soluble fiber and polyphenols by subsequent changing of pH value and enzymatic treatment. The process of the invention requires only using green chemical solvents which do not pose a risk for consumers or environment, thus the extracts are of a higher safety and less costly as they do not require further purification prior applications.

Any suitable enzymatic treatment may be employed to enhance the yield of soluble fraction. Said enzymatic treatment can be performed by an enzyme chosen from a group such as, but not limited to pectinase, polyphenolases, amylases, proteases, trypsine, pentosanases, glucanases, cellulases, hemicellulase, trypsine, carbohydrases, xylanases, pectinases, tannase, beta-amylase and alpha-amylase.

The method disclosed ensures a high extraction yield of the extracted constituents. The optimized extraction process ensures that the extraction yield is higher than 15 wt %, preferably higher than 25 wt %, most preferably higher than 30 wt %, calculated on a basis of the dried cacao pod husk weight. Each step is optimized in order to increase the yield and minimize parameters such as processing time and temperature, extreme conditions and the use of non-green reactants, such as organic solvents. Thus, cacao pod husk extract obtained according to the present invention is a green product with a more clean label.

In the preferred embodiment, the extract is further processed by a method comprising the steps of a) grinding of the cacao pod husk extract; b) the first enzymatic treatment; c) alkaline solubilization; d) the first decantation with centrifuge; e) ultrafiltration; f) acid extraction; g) the second decantation with centrifuge; h) the second enzymatic treatment; i) ultrafiltration and extract purification; j) concentration of the extract; k) drying of the concentrated extract. By this step, the optimized full utilization of the cacao pod husks is achieved, wherein the utilization yield is higher than 80 wt %, i.e. utilization yield calculated on a basis of the weight of dry cacao pod husks is 81 wt %, 82 wt %, 83 wt %, 84 wt %, 85 wt %, 86 wt %, 87 wt %, 88 wt %, 89 wt %, 90 wt %, 91 wt %, 92 wt %, 93 wt %, 94 wt %, 95 wt %, 96 wt %, 97 wt %, 98 wt %, 99 wt % and 100 wt %. In the preferred embodiment, the yield is higher than 85 wt %, in the most preferred embodiment the yield is higher than 90 wt %.

In a preferred embodiment the invention relates to an optimized method for full utilization of cacao fruit pods comprising the steps of debacterizing the surface of cacao pods, opening said pods and separating cacao pod husks, cacao pulp, cacao placenta and cacao beans.

After the shredding of the cacao pod husks to cacao pod husk flakes of a uniform size, the product is conveyed into a batch or continuous dryer applying temperatures below 60° C., preferably below 50° C. for about 6 hours, preferably less than 3 hours.

The time and temperature is dependent on the dryer capacity and performance of the dryer. The drying temperature and time is limited to avoid the deterioration of the taste of the products, as well as the polymerization of phenolic compounds.

The first step of the process for complete utilization of cacao byproducts according to the present invention is pre-treatment of cacao pod husks in order to debacterize the pod surface. Cacao pods are perishable products, thus rotting pods rapidly become a source of infection with microorganisms. Therefore, it is necessary to ensure their microbiological quality prior to production process. For such pre-treatment, according to the present invention, unopened cacao pods are treated with a preserving agent for a period of time sufficient to neutralize any harmful substances on the surface of the cacao fruit and stabilize lignification of the outer layer (peeling) of the cacao fruit. Almost any known preserving agent effective in a low concentration can be employed in this process, such as sorbic acid and salts thereof, sulfur dioxide, chlorine, chlorides, nitrates, hypochlorites, preferably those of the alkali metals, disulfites, ozone, methylformate, diphenyl, sodium ortho-phenyl phenolate, nitrogen trichloride and others. Typically, the preserving agent is employed in the form of an aqueous solution of a low but effective concentration. The concentration of the preserving agent depends, of course, upon its effectiveness and varies considerably. Optimum concentrations which do not detrimentally affect the quality of cacao fruit, can readily be determined by a person skilled in the art by routine experimentation. It is also possible to apply the preserving agent by exposing the unopened cacao pod husks to the vapors of vaporizable preserving agents, preferably diluted with air or inert gases. The treatment with the preserving agent varies depending upon the concentration and effectiveness of the agent and may last for a period of time between 1 hour and up to sixty days, preferably between 8 hours and 8 days although it is not limited to such a period of time. The "whole", harvested cacao fruit is placed directly into a bath or atmosphere containing a preservative, typically at a low but effective concentration of preservative, for instance, between 0.2 and 10%, and for a period of time sufficient to neutralize any toxic substances on the surface of the fruit and to stabilize lignification of the outer layer (peeling) of the fruit. To accomplish this, it generally requires between 10 min and 3 or more months, preferably 30 min to 24 h, most preferably 30 min to 3 h of exposure to the bath or atmosphere, depending upon the effectiveness and type of preservative used. Any known preservative can be employed in this step of the process, for example, sorbic acid, sorbic acid salts, sulfur dioxide, chlorides, nitrates, chlorine, hypochlorite, formaldehyde, disulfides, ozone, methylformate, diphenyl, ammonia, sodium o-phenyl phenolate, nitrogen trichloride, and others. The preferred preserving agents are sorbic acid, sulfur dioxide, chlorine, sodium chloride and hypochlorite, as many other known agents, although useful, tend to affect the taste and nutritive value of the treated cacao pods.

According to the present invention, cacao pod husk extract can be obtained by using the extraction process to extract cacao pod husks with or without removal of the outer peel of the cacao fruit. The present invention demonstrated that water soluble fiber content is particularly high in the outer peel of the cacao fruit. The outer peel is preferably not discarded, in order to achieve the high water soluble fiber yield in the said extraction process.

In accordance with the method for treating the cacao fruit and in order to completely utilize the various components thereof, according to the present invention, the outer skin or peeling of the harvested cacao fruit can be optionally removed before the fruit is opened to remove the cacao beans and cacao bean hulls together with mucilage pulp and placenta. Many varieties of cacao fruit and especially younger fruit may have their peelings removed by conventional techniques without first subjecting the said fruit to any special treatment. However, an average mixture of harvested fruit contains a significant percentage of certain varieties and/or older fruit which require a pre-treatment before the peelings are removed. In case of removing the outer skin, to ease the peeling of pods, cacao pod husks are steamed and/or treated by using an alkaline solution. For this purpose the cacao fruit is treated with an alkaline bath such as an alkali metal hydroxide or, preferably, alkali metal carbonate bath at a temperature between 50° C. and about 100° C. for a short period of time, e.g., generally from ½ minute to 30 minutes, preferably from 3 minutes to 8 minutes. Thereafter, the alkaline-treated fruit are passed through a heating zone, preferably through an infrared heated channel. The alkaline treatment at 50° C. to 100° C. for a short period of time causes the cacao fruit to swell to a certain extent. This swelling facilitates subsequent removal of the outer layers of the fruit such as the fruit peel. These outer layers are removed, for instance, by means of scrapers, knives, rollers, rubber discs, or other such/similar means. The preferred means of this type are rubber discs rotating at a high velocity, emery rollers, toothed or corrugated rubber or plastic rollers. It will be understood that lower temperatures and longer treatment times may also be employed.

After the outer peel has been removed in this manner, i.e., using an alkaline pre-treatment, the remaining fruit is neutralized and the action of enzymes on the fruit surface is reduced or completely eliminated by treating the fruit with a suitable acid. Said acid is preferably an edible acid, such as, but not limited to citric acid, malic acid, tartaric acid, ascorbic acid, and the like. Phosphoric acid and hydrochloric acid may also be used. Treatment with sulfur dioxide is also possible and frequently of considerable advantage. The amount of acid added is such that the pH-value of the treated cacao fruit is below a pH of 7.0, preferably at a pH between 5.0 and 6.0.

The following step disclosed in the present invention comprises opening of the cacao fruit and removal of cacao beans together with cacao bean hulls, pulp and placenta. The opening of the cacao pods is done by a cacao pod splitting machine, or any other suitable instrument. The cacao pod husk is shredded in any cutting machine or disintegrator.

The aim of the present invention is to develop a process to utilize the constituents of separated cacao pod husks, mainly by employing water extraction processes and avoiding the use of organic solvents.

The first step of the process is to grind the cacao pod husks. This step aims to obtain a very fine and homogeneous paste. Some additional treatment, such as, but not limited to, ultrasonic or high-pressure system, may be additionally applied to burst tissue and cells and to recover the intracellular liquid phase. The grinding of the obtained cacao pod husk is performed with a standard hammer mill or any other suitable milling system. Optionally, this is done with a milling device specialized to get fine particle size distributions.

The next step is enzymatic treatment. The degrading enzymes used during enzymatic treatment are those which are capable of degrading insoluble molecules present in cacao pod husks, such as polysaccharides, proteins, cellulose and other insoluble constituents. Any degrading enzyme that is proven to be efficient in the art of extraction of cacao pod husk constituents can be used according to the present invention. Examples of degrading enzymes used in the art include polyphenolases, amylases, proteases, trypsine, pentosanases, glucanases, cellulases, hemicellulase, trypsine, carbohydrases, xylanases, pectinases, tannase, beta-amylase and alpha-amylase. One or more of these may be used in the enzymatic treatment of the suspension in the present invention. The present invention encompasses the separate and sequential treatment with different classes of enzymes.

In particular, the present method comprises a first enzymatic treatment, which is carried out on the above-described aqueous suspension of grinded cacao pod husks in water and represents a treatment with one or more insoluble fiber degrading enzymes. Said fiber degrading enzyme is preferably selected from the group consisting of cellulase and xylanase.

The aim of this step is the degradation of insoluble fiber which are indigestible to soluble fiber with multiple health benefits.

In another embodiment, the enzymatic treatment can be performed with one or more protein degrading enzymes. The aim is to degrade complex proteins which may be difficult to extract to peptides and peptide hydrolysates using protein degrading enzymes, for instance proteases. A non-limiting example of such protease is trypsin. A lack of protein in food is becoming a global problem and there is a high urge for new sources of protein for human and animal consumption. Besides the isolation as native proteins, it is possible to extract proteins in different forms from the raw material. Hydrolyzed proteins such as peptides provide better water solubility as well as many functional and nutritional properties depending on their size, amino acid profile and composition. The protein degradation could be applied at neutral pH to solubilize the main part of the protein hydrolysates obtained from protein lysis. Optionally, this could be done in mild acidic or alkaline conditions, optimized to enhance the peptide extraction. The parameters of hydrolysis must be adapted to this enzymatic hydrolysis. Temperature is controlled to be not higher than 80° C., preferably not higher than 70° C., most preferably not higher than 65° C. The pH value is in the range pH 5-9, preferably pH 6.5-7.5. The duration of hydrolyses is 1-6 h, preferably 1-4 h, most preferably 2-3 h.

The concentration of the enzyme used in the enzymatic treatment will depend on its activity and also on the type of conditions of the extraction process. The concentration can be optimized by the skilled person according to standard laboratory procedures. Generally the quantity of enzyme used is 0.1 wt % dry solids, though higher or lower concentrations are equally possible given the multiple factors available. Preferably, the concentration of enzyme is between 0.01 and 0.10 wt % dry solids.

The enzymatic treatments aiming to degrade the proteins to peptides are optionally repeated more than once, according to the present invention.

The extraction mixture is generally agitated continuously during enzymatic treatment. This is achieved, for example, by using a stirrer, jets, agitated vessel or any means known in the art.

After enzymatic treatment the reaction may be stopped. This can be achieved, for example, by heating to an inactivation temperature (e.g. 95° C.) or by adding an enzyme inhibitor to the mixture.

Alternatively, cacao pod husk powder can be treated with suitable protease, such as, but not limited to *Bacillus licheniformis* protease, to enhance the peptide extraction process. Said bacterial protease can be used in a concentration range determined by a skilled person, and generally is 0.1 wt % dry solids, though higher or lower concentrations are equally possible given the multiple factors available.

The following step is solubilization of the cacao pod husk material in an alkaline conditions. This treatment could be completed by adding suitable alkaline to adjust 20 pH to the range pH 7.5-11.5, preferably pH 8.5-11.0, most preferably pH 9.5-10.5 at a temperature not higher than 85° C., preferably at a temperature between 60 and 70° C. In a preferred embodiment, a suspension of cacao pod husk powder, 10 to 30 wt %, is subjected to mild soaking in an aqueous solution in water or water ethanol with addition sodium hydroxide in concentration from 5 to 50 wt % (dry basis), for up to 2 h, preferably for 1 h, for carrying out the claimed process. The pH value of this suspension differs according to the type of cacao pod suspension. This is followed by processes of re-extracting cacao pod husks and collecting the obtained extracts. Alternatively other bases can be used in this process, but bases used for adjusting the pH value must be of the proper type and must be safe for foods. The bases used are comprising but not limited to potassium hydroxide and calcium hydroxide.

The liquid phase extract and solid residue are separated by centrifugation, decantation or any suitable industrial method. At an industrial scale, a decanter is adapted to clarify the liquid phase and to obtain a raw residual material with a high dry matter.

A water washing treatment of the solid phase with mixing can be applied to recover all the residual protein from raw residual material.

These steps can be optionally followed by refining of the raw residual material with a plate refiner. This allows to reduce the volume of wastewater, and essentially breaks up the large fibers and facilitates their later extraction.

Obtained refined raw material is optionally dispersed and homogenized to enhance peptide and soluble fiber extraction at this stage.

Applying alternative thermal and mechanical energy generating processes using the appropriate apparatus is possible, such as, but not limited to, high intensity ultrasonication, extrusion, cooked extrusion, instantaneous decompression, and the like. These can induce dramatic changes in the structure of cacao pod husk constituents and thereby enhance their extraction.

The suspension present at the end is subjected to ultrafiltration. Such ultrafiltration processes comprise, but are not limited to pressure filtration, using classical pressure-filtration equipment, continuous centrifuging, using a horizontal centrifuge, and the like.

A water washing treatment with mixing of the solid phase can be applied to recover all the soluble components in the extract of the raw residual material.

The extract portions are collected and excessive solvent is evaporated under vacuum, or lyophilised using a lyophilisator, or subjected to any other suitable system to obtain concentrated extract.

Cacao pod husks are an important source of protein with protein content varying from 4-9 wt % on a dry basis. This implies the presence of numerous ingredients in the extracts of the cacao pod husks, with different properties and application. The steps of enzymatic and alkaline treatment allow the extraction of the majority of the protein fraction of the pod husks.

Alkaline extraction also partially facilitates the water soluble fiber extraction. Still, the main portion of fiber is to be extracted from the raw residual material during the step of acid treatment. An acid treatment could be carried out on the raw residual material obtained by centrifugation, decantation or any other suitable method. This treatment is adapted to solubilize pectin and some other water soluble fibers.

Recently, considerable attention has been directed towards the importance of dietary fiber. Dietary fiber is generally defined as the sum of the indigestible carbohydrate and carbohydrate components of food, including cellulose, lignin, hemicelluloses, pentosans, gums and pectins. The market for dietary fiber is highly competitive. The production of dietary fiber rich products from fruit byproducts and the potential preparation of those fibers with other associated bioactive compounds is gaining more attention. While milling and enzymatic digesting have been the main steps in obtaining high dietary fiber powders from cereals; wet milling, washing, drying and dry milling are very important in producing fibers from fruit.

The raw residual material obtained from the previous steps of the present invention is subjected to an extraction process, using a hot water in acidic environment (pH <7.0), preferably at pH 1.5 to 6.5, most preferably pH 2.5 to 4.0. Hot water extracts obtained outside of this pH range do not adequately exhibit the function expected as the object of the present invention. Optionally, an additional grinding step to affect hydration properties can be performed on said raw residual material, in the way that the increase of surface area leads to fibers that hydrate more rapidly.

When extraction is performed in the strongly acidic pH range of lower than pH 1.5, the dietary fiber decomposes to a lower molecular weight and therefore loses its functionality.

Since dietary fiber extracted in the alkaline range of pH 7.0 and above has a high hemicellulose content and a low content of pectinic polysaccharides containing galacturonic acid, it cannot provide adequate dispersion stability of proteins in the weak acidic pH range above the isoelectric point. In addition, galacturonic acid methyl ester is partially decomposed while the polysaccharides themselves are decomposed by elimination, such that an adequate function is not exhibited. The flavor is also impaired due to the reaction of sugars with the protein.

The ratio solid matter/extractant was not higher than 1:1 w/v, preferably not higher than 1:10 w/v, most preferably not higher than 1:20 w/v. The acids used for the extraction procedure can be any acid suitable for use in the food industry, such as, but not limited to acetic, citric, lactic, malic, tartaric, hydrochloric, nitric, oxalic, phosphoric and sulfuric acid. In a preferred embodiment, this acid is an organic acid such as acetic, citric, lactic, malic and tartaric, most preferably citric acid.

The extraction temperature to obtain the cacao pod husk water soluble dietary fiber in the aforementioned pH range is preferably higher than 85° C. under pressure. When the extraction is performed at a temperature of below 85° C., time is required for elution of the water-soluble dietary fiber, thus creating an economic disadvantage. On the other hand, while the extraction is completed in a shorter time with a higher temperature, an excessively high temperature will adversely affect the flavor and color while also resulting in reduced function due to the lower molecular weight of the water-soluble dietary fiber; the temperature is therefore preferably no higher than 100° C.

The extraction process is performed during the period up to 5 h, preferably 1.5-4 h, most preferably 3 h. Optionally, high pressure, or any other suitable industrial method can be used to facilitate the extraction process.

According to the present invention, it is possible to further disentangle the cellulose and pectin molecules of the cell wall in the raw residual material by change of a pH i.e. by treating said raw residual material for at least 2 hours at a pH lower than 3, preferably a pH between 1 and 3, a temperature of at least 100° C., and a pressure which is at least 1 bar higher than the ambient pressure.

In particular, it is also possible to disentangle the cellulose and pectin molecules in the cell-wall by decreasing the pH, preferably by applying a pH of between 1 and 3. By doing so, the tight structure of the cell walls can be loosened, and some additional water soluble fiber fraction yielded in the finished extract.

In order to succeed, additional energy is to be applied, for example in the form of an increased temperature. Preferably the temperature is increased to a temperature of at least 70° C., but not higher than 140° C.

Furthermore, in order to avoid the extraction mixture from boiling and that thus a lot of energy would be lost, and that an industrial process would become less feasible, the pressure applied during the process is also preferably increased. In a preferred embodiment, the applied pressure or ambient pressure is initially comprised between 1 and 1.5 bar. Preferably said applied or ambient pressure is raised during the method to a pressure comprised between 2 to 5 bar. The terms "ambient pressure" and "applied pressure" are used herein as synonyms.

The following step is a separation of raw residual material and obtained water extract. The liquid phase and solid residue can be separated by centrifugation with a decanter or sedicanter, or any other suitable instrument. This was done using a standard centrifuge for not shorter than 30 min, or any other suitable system, to achieve separation of the extract (liquid fraction) and precipitation of raw residual material. A water washing treatment of the solid phase with mixing can be applied to recover all the soluble components of the raw residual material.

In a preferred embodiment, raw residual material is combined with an equivalent weight of water and the mixture again centrifuged. The resulting supernatant liquid is mixed with the previously collected extracts.

Alternatively, cacao pod husk water soluble fiber can be purified by an active carbon column for purification or any other suitable purification process and then dried to obtain water-soluble dietary fiber.

The obtained extract (liquid phase) contains pectin and fibers and the raw residual material contains insoluble cellulose and hemicellulose and some other insoluble fibers.

The following step comprises the second enzymatic treatment applied to acid or neutral pH to solubilize the hemicellulose and a part of the cellulose.

This process allows to obtain some soluble phase of polysaccharides as xylose, with enzymes such as, cellulases, hemicellulases, pectinases, amylases, β-glucanases, carbohydrases, xylanases, and the like. This step is done in mild acidic or neutral conditions, optimized to enhance the enzyme induced fiber degradation. The parameters of hydrolysis must be adapted to this enzymatic hydrolysis. Temperature is controlled to be not higher than 80° C., preferably not higher than 70° C., most preferably not higher than 65° C. The pH value is in the range pH 4.5-7, preferably pH 5.5-6.5. The duration of hydrolyses is 1-6 h, preferably 1-4 h, most preferably 2-3 h.

The concentration of enzyme used in the enzymatic treatment will depend on its activity and also on the type of conditions of the extraction process. The concentration can be optimized by a skilled person according to standard laboratory procedures. Preferably, the concentration of enzyme used is between 0.01 and 0.10 wt % of raw residual material.

The enzymatic treatments aiming to degrade the remaining insoluble fiber in raw residual material are optionally repeated more than once according to the present invention.

The extraction mixture is agitated continuously during enzymatic treatment. This is achieved, for example, by using a stirrer, jets, agitated vessel or any means known in the art.

After enzymatic treatment the reaction may be stopped. This can be achieved, for example, by heating to an inactivation temperature (e.g. 95° C.) or by adding an enzyme inhibitor to the mixture.

The obtained cacao pod husk extract after extraction can be additionally treated to remove (desalt) the mineral components by electrodialysis, ion-exchange resin treatment, or the like, and additional purification of said extract can be obtained by carrying out ultrafiltration, active carbon treatment or resin treatment, or precipitation treatment with a solvent such as ethanol or isopropanol, to remove the hydrophobic substances or low molecular substances (for purification), after which it may be concentrated under vacuum or any suitable method. Said extract can be further purified by removal of the low molecular color components or foul-tasting components (purification) by UF membrane or ceramic filter separation.

Optionally, a step of precipitation of cacao pod husk water soluble fiber using alcohol, preferably ethanol can be done. Cacao pod husk water soluble dietary fiber is mixed with said alcohol and the precipitate is collected using simple decantation process. After the precipitate is collected, if necessary, the extract is again washed with ethanol in concentrations 80%, 90% and 99% v/v. In a preferred embodiment after adding 85% ethanol to an cacao pod husk water soluble dietary fiber extract to reach a concentration of 50% to precipitate water-soluble dietary fiber, the precipitate is successively re-washed with ethanol in the same manner and air dried to obtain water-soluble dietary fiber especially enriched in pectin. The precipitation process and washing with ethanol can be repeated until a precipitate of suitable characteristics is obtained. Precipitation temperature is not higher than 85° C., preferably not higher than 70° C., most preferably precipitation temperature is 60° C.

The precipitated pod cacao husk water soluble fiber can be collected as a precipitate, or dissolved in adequate amount of water, and then added to collected cacao pod husk extract.

All liquid extracts collected during the disclosed process are finally combined in order to get a cacao pod husk extract. Optionally, obtained fractions of said cacao pod husk extract can be used separately, if appropriate for a specific use. The excessive solvent present in obtained extracts is removed by heating, vacuum evaporation, or any other suitable process thereof.

Said process for removal of solvent is evaporation by vacuum pump, lyophilisation, or any other suitable process. The end product of cacao pod husk extraction is preferably a dry cacao pod extract.

The present invention discloses cacao pod husk extract, obtainable from cacao pod husks, characterized by a high yield, wherein said yield is higher than 15 wt %, preferably higher than 25%, most preferably higher than 30 wt % calculated on a basis of weight of dried cacao pod husks. Cacao pod husk extract according to the present invention is characterized by protein content not less than 10 wt %, preferably not less than 15 wt %, most preferably not less than 20 wt % of said dry cacao pod extract.

The extract obtained by the present invention is characterized by the high level of water soluble dietary fiber. Said water soluble dietary fiber comprises, but is not limited to, pectin, xylo-oligosaccharides, galactomannanes, glucomannanes, dietary fiber obtainable as a degradation products of hemicellulose and the like.

Pectin obtainable from cacao pod husks of the present invention is characterized by a high galacturonic acid, a particularly low methyl esterification degree and high acetylation degree. Said cacao pod husk extract, is characterized by the content of soluble fiber not less than 20 wt %, preferably not less than 25 wt %, most preferably not less than 30 wt % of said extract.

Cacao pod husk water soluble dietary fiber according to the present invention comprises pectin, characterized by a low methyl esterification degree. The said degree of methyl esterification is not higher than 40%, preferably 10-30%, most preferably 10-15%. The degree of esterification has an impact on the physical properties of pectin: emulsion formation, surface tension, stabilization of tissue, and gel characteristics.

Depending on their degree of methyl esterification (DE), pectins are referred to as high methyl esterified pectins or high metoxy pectins (DM 50%) or low methyl esterified (methoxy) pectins (DE<50%). High methyl esterified pectins form gels in an acidic medium (pH 2.0-3.5) if sucrose is present at a concentration higher than 55 wt %. Low methyl esterified (methoxy) pectins can gel over a larger pH range (2.0-6.0) in the presence of a divalent ion, such as calcium. In this case, the presence of sucrose is not necessary for forming the gel.

Pectins with a low degree of methyl esterification are particularly suitable for making low sugar confectionery products, such as, but not limited to, jams and different fruit preparations, but also in acidic protein food products such as yoghurts, chocolate milk and milk beverages for use in the food industry. Thus, cacao pod husk water soluble dietary fiber comprising pectin characterized by a low methyl esterification degree is suitable for the low sugar confectionary products as well as protein beverages.

Cacao pod husk water soluble dietary fiber according to the present invention comprises pectin, characterized by a high acetyl esterification degree. The said degree of acetylation is 20-60%, preferably 30-60%, most preferably 40-60%. Acetylation, like methylation, decreases the affinity of pectin for cations, which has an impact on the gelling ability of pectin. Furthermore, it has an effect on surface activity, emulsion stability and viscosity of compositions comprising said pectin.

The content of galacturonic acid in said pectin is not less than 50 wt %, preferably not less than 60 wt %, and most preferably not less than 65 wt %.

An increase in acid strength (that is, decreasing pH) of the water extraction can affect the galacturonic content at the end of this process. Moreover, acid type and concentration affect the yield, physiochemical and functional properties of pectin.

Galacturonic acid content was measured according to the Blumenkrantz method, and neutral sugars were measured by GLC as alditol acetates.

However, said cacao pod husk water soluble dietary fiber is comprising galactose, rhamnose, glucose, mannose, ribose, inositol, myo-inositol, moisture (up to 20 wt %), (glucurono) arabinoxylans (GlcA, Ara and Xyl), galactan (Gal), mannan (Man). Most remarkable were the high amount of arabinoxylans (present in concentration of at least 3 wt % of disclosed cacao pod husk water soluble dietary fiber) that can be used as prebiotics. The cacao pod husk extract obtained by the present invention is characterized by xylooligosaccharides content of at least 0.1 wt %, preferably at least 1.5 wt % of the dry weight of cacao pod husk extract. The cacao pod husk extract obtained by the present invention is characterized by galactomannan content of at least 0.1 wt %, preferably at least 1.5 wt % of the dry weight of cacao pod husk extract. The cacao pod husk extract obtained by the present invention is characterized by glucomannan content of at least 0.1 wt %, preferably at least 1.5 wt % of the dry weight of cacao pod husk extract.

Xylooligosaccharides selectively feed beneficial bacteria such as bifidobacteria and lactobacilli within the digestive tract. A large number of clinical trials have been conducted with xylooligosaccharides, demonstrating a variety of health benefits, including improvements in blood sugars and lipids, digestive health benefits, laxation, and beneficial changes to immune markers. These health benefits have typically been observed at 1-4 g/d, which is a lower dose than required for prebiotics such as fructooligosaccharides and inulin.

Glucomannan is a dietary fiber. Orally, glucomannan is used for constipation, weight loss, diabetes, high cholesterol, overactive thyroid (hyperthyroidism), high blood pressure, and stomach conditions called dumping syndrome and functional gastrointestinal disorders. In food products, glucomannan is used as a thickener or gelling agent. Glucommanan flour and powder are used in food.

Similarly, galactomannans, as dietary fibers are often used in food products to increase the viscosity of the water phase.

The present invention aims to produce a low cost cacao pod husk extract characterized by the additional health benefits (prebiotic), higher market price setting and ingredient functionality. The above-mentioned soluble fibers are particularly suitable for use in fat-based dispersions and have a low impact on adherence and graininess.

Antioxidant compounds show health benefit properties and protective effects against various free radical-induced pathologies. Various studies providing evidence for the health benefit potential of cocoa bean polyphenols and other antioxidant compounds against cancer development have been largely reviewed. By contrast, work on the antioxidant properties of the constituents of cacao pod husks remains rather scarce.

In the present invention, polyphenols are detected in remarkable amounts in the cacao pod husk. The polyphenol content is especially high in the outer layer of the cacao pod husk, which significantly increases the total polyphenol content in the cacao pod husk extract obtained by the processing of unpeeled husks. Polyphenols from the cacao pod husks according to the invention are extracted by suitable solvent extraction techniques. As an extraction solvent any suitable polar, water miscible solvent can be used, including but not limited to methanol, ethanol and acetone, their mixtures and the like. The extracts are prepared using short extraction times and mild temperature conditions, as appropriate. Obtained extracts are typically centrifuged, filtered and the solvent is evaporated under vacuum or freeze-dried. Such polyphenol enriched extracts can be further purified; for instance, by gel permeation chromatography or by preparative High Performance Liquid Chromatography (HPLC) techniques or by a combination of such techniques. The total content of the polyphenols, can be determined spectrophotometrically, by using the FC reagent or by any other suitable method, including but not limited to HPLC. The biological activity of the extracts can be assigned to cocoa polyphenol(s) such as flavanols. These cocoa flavanols, such as procyanidins have significant anti-cancer, antitumor or antineoplastic activity, and cacao pod husk powder according to the invention is a suitable raw material for pharmaceutical compositions targeting those activities. Such polyphenol rich extracts are particularly suitable for production of functional foods and pharmaceutical compositions.

An extract obtainable in an optimized process for full utilization of cacao pod husks is characterized by moisture content below 10%, polyphenol content preferably at least of 40 mg/g, preferably at 70 mg/g, most preferably at least 90 mg/g, soluble fiber content not less than 20 wt % and protein content not less than 10 wt % of total weight of said extract.

In a preferred embodiment, said extract is purified resulting in a polyphenol level of at least 200 mg/g, preferably above 260 mg/g and most preferred above 300 mg/g.

The process for the optimization for the full utilization of the extraction is particularly suitable for obtaining macro compounds or composite compound, such as but not limited to, protein and protein hydrolysates, such as amino acids, peptides; pectin; soluble fiber; insoluble fiber; carbohydrate; oligosaccharide; xylose; hemicellulose; sugars, such as, but not limited to fructose, sucrose, glucose, and the like; sugar syrup; cellulose; lignin; polyphenols; flavanols, minerals (ash), aroma extract, and the like.

In a preferred embodiment, the extract obtainable by the process of the invention is subjected to a demineralization process. The enzymatic and alkaline/acidic extractions yield the extract compromising proteins and protein lysates, polyphenols and soluble fibers. However, said extract is rich in ashes. For a demineralization, in order to reduce the ash content, a suitable technique such as, but not limited to nanofiltration, electrodialysis and purification on a resin can be used, without departing from the scope of the present invention.

The present invention is directed to processing of the cacao placenta. After opening the pods, cacao pulp, cacao beans together with cacao bean hulls are removed, while cacao placenta can be scraped or removed from the inner side of cacao pod husk by any sort of scrapers, knives, rollers, rubber discs, or the like. The placenta is milled using any suitable milling system and said powder is extracted using water in mild acidic or mild alkaline environment, at a temperature controlled not to exceed 80° C., preferably not to exceed 70° C., most preferably not to exceed 65° C.

The pH value is in the range pH 5-9, preferably pH 6.5-7.5. The duration of extraction is 1-6 h, preferably 1-4 h, most preferably 2-3 h. The extraction of cacao placenta is performed in presence of one or more protein degrading enzymes, preferably selected from the group comprising proteases, such as, but not limited to trypsin, exoproteases, endoproteases and the like. This process aims to increase a peptide content in said cacao placenta extract. This step is aiming degradation of proteins to peptides and peptide hydrolysates, using protein degrading enzymes, for instance proteases. The protein lysis could be applied at neutral pH to solubilize the main part of peptide hydrolysates obtained thereof. Optionally, this could be done in mild acidic or alkaline conditions, optimized to enhance the peptides extraction.

Obtained extract is separated from the residual raw material by means of filtration, centrifugation, and decantation, or any other suitable treatment thereof, to remove water insoluble raw residual material.

A lack of protein in food is becoming a global problem, and there is a high urge for new sources of protein for human and animal consumption. Proteins in hydrolyzed form such as peptides are of a better water solubility as well as many functional and nutritional advantages depending on their size, amino acid profile and composition.

Cacao placenta is a good source of protein, with protein content not less than 10 wt %, preferably not less than 15 wt % on dry matter. Sugars represent not less than 15 wt % of dry matter, preferably not less than 20 wt % of dry matter, while polyphenol content is not less than 0.2 wt %; preferably not less than 0.4 wt %.

Thus, obtained cacao placenta extract according to the invention is a new source of cacao peptides, soluble fiber and sugars, but also polyphenols.

The proposed industrial processes of the present invention, disclose a stable, low cost and environmentally friendly method to fully utilize the cacao byproducts and to obtain products of a stable and pleasant aroma, and chemical composition suitable for use as functional food ingredients in food compositions.

The term "functional food", as used herein, means a food given an additional function, i.e. food that is designed to have physiological benefits and/or reduce the risk of chronic disease beyond basic nutritional functions, and may be similar in appearance to conventional food and consumed as part of a regular diet.

The cacao pod husk extract of the invention is characterized by a high content of nutrients such as, but not limited to dietary fiber, sugars, peptides and other protein lysate products and polyphenols. Therefore, said extract is suitable for use in food applications, particularly dietary compositions and chocolate.

Said extract can be used in a food product together with any other suitable food ingredient. Said extract is green, with no artificial sweeteners and characterized by mild cacao aroma.

The present invention discloses the cacao pod husk extract which can be used for nutritional compositions rich in dietary fiber. The said extract is characterized by a solubility in aqueous solvent at a temperature of 20° C. of at least 50 wt %, preferably 75 wt %, most preferably 90 wt %. As such, said extract can be utilized as a dietary fiber source in food when used in concentrations of 5-40 wt %, preferably 5-30 wt %, most preferably 10-25 wt % of the weight of the finished food product. In comparison to the prior art products, the cacao pod husk extract of the present invention is characterized by increased weight ratio of dietary fiber, which allows for consumption of high percentages of dietary fiber without the disadvantage of high caloric intake. Said extract according to the present invention is improved over the prior art products, which were attempts to mask the fibrous, rough mouthfeel texture of dietary fiber. While the prior art masked the unpleasant fiber taste typically with fats and carbohydrates, the present invention uses cacao byproducts as a source of dietary fiber concentrates of the pleasant taste, that can mask even the taste of insoluble fibers in finished food products. Thus, the present invention provides novel dietary fiber compositions, obtained from cacao byproducts in a low cost and green manner. Said cacao pod husk extract according to the present invention is particularly suitable for enriching beverages and molasses, particularly milk beverages, chocolate milk, yogurts, puddings, sport and nutritional shakes and the like.

In comparison to other, previously disclosed high fiber cacao products, the present invention discloses a cacao pod husk extract, rich in polyphenols, such as proanthocyanidins, flavanols, and clovamide. Disclosed combination of dietary fibers and polyphenols ensures the health, nutritional and/or functional benefits of the compositions substantially containing cacao pod husk extract of the present invention. Said extract is a suitable functional food ingredient that can be used for health benefits related to polyphenols, such as, but not limited to, cardio-, vaso- and hepato-protection, antimicrobial, anti-inflammatory, and anticancer activities.

Disclosed cacao pod husk extract is suitable for food application as a bulk ingredient.

The present invention discloses the cacao pod husk extract rich in peptides and other protein lysates, which is suitable for use as a protein source in food products such as, but not limited to, chocolate, milk products and milk substitute beverages, sport drinks, shakes, ice-creams, dressings, fruit and vegetable concentrates, and the like. The said cacao pod husk extract can be used in concentrations of 5-40 wt %, preferably 5-30 wt %, most preferably 10-25 wt % of the weight of the finished food product. The finished food product is characterized by a natural and pleasant aroma, mild sweetness, and a green label. The cacao pod husk extract of the invention enables minimalizing of the content or total replacement of artificial additives, preservatives, sweeteners, and the like. Food products substantially comprising said extract represent vegan and kosher alternatives to animal derived products.

The cacao pod husk extract obtained according to the present invention is a good stabilizer and it can serve as a stabilizing agent in different products, such as but not limited to confectionary products, chocolate, milk beverages, yoghurt, fruit juices, fruit concentrates, dressings, sauces, creams and the like. Said extract is particularly suitable as a dispersion stabilizer in drinks and molasses, as it is characterized by a good water solubility. The cacao pod husk extract obtained according to the present invention can be used in concentration of 0.2-30.0 wt %, preferably 0.2-10.0 wt %, most preferably 0.2-5.0 wt % in said food product to exert stabilizing effect.

The cacao pod husk extract is particularly efficient when used as a stabilizer in acidic dairy beverages. Said extract is utilizing its function of stabilizing dispersion of proteins in the pH range below the isoelectric point, but also in a pH range above the isoelectric point, in a state of higher viscosity, thereby making it possible to prepare acidic protein food products that are stable in a pH range above the isoelectric point, which is not possible by commercially obtained pectin or other green stabilizing agents disclosed in the prior art.

For the high content of dietary fiber, the cacao pod husk extract of the invention is also a good thickening agent, which increases the viscosity of the composition. The cacao pod husk extract exert thickening properties, so it represents a good replacement for "non-clean" thickeners (e.g. carrageenan). The said cacao pod husk extract can be used in an amount of about 0.2-30.0 wt % and preferably 0.2-20.0 wt % with respect to the final protein content of food product, but these ranges are not limitative on the scope of the invention as they will vary depending on differences in protein concentration. Said cacao pod husk extract allows preparation of said food protein products together with conventional stabilizers, for example, polysaccharides such as pectins, water-soluble soybean polysaccharides, carboxymethylcellulose sodium, alginic acid propylene glycol ester, carrageenan, furcellan, tamarind seed polysaccharides, tara gum, karaya gum, guar gum, locust bean gum, tragacanth gum, pullulan, gelan gum, native gelan gum, gum Arabic, dextrin, cyclodextrin, agar, microcrystalline cellulose, xanthan, processed starch and the like, or hydrolysates thereof, gelatin, organic acid salts, polymerization phosphoric acid salts, emulsifiers, heat-denatured proteins and the like, which can lead to increase of the stable pH range.

The cacao pod husk extract may be used in any ordinary dairy products, such as, but not limited to milk, whole powdered milk, powdered skimmed milk, cream, butter, whole condensed milk, condensed skimmed milk, processed milk powder, chocolate milk and the like.

The cacao pod husk extract obtained according to the present invention can be utilized as a replacement of cocoa powder in food products. The use of said cacao pod husk extract will allow for reduction of the cacao powder up to 30 wt %, preferably up to 50 wt %, most preferably up to 60 wt % in the finished food product. The flavor of the food product substantively comprising the extract of the present invention will be characterized by a mild and pleasant cacao aroma. Alternatively, a specific aroma can be achieved from flavoring agents, which can be used as a source of flavor. These flavoring agents may be chosen from synthetic flavor oils and flavoring aromatics, and/or oils, oleo resins and natural extracts derived from plants, leaves, flowers, fruit and so forth, and combinations thereof. These flavoring agents are generally liquids, which allow easy and compete miscibility of the flavoring agent into the cacao pod husk extract of the present invention. When used as a flavoring agent, said cacao pod husk extract can be used in concentrations of 1-30 wt %, preferably 5-25 wt %, most preferably 10-20 wt %.

The compositions substantially comprising the cacao pod husk extract obtained according to the present invention can serve as prebiotics, for the presence of water soluble fiber such as xylooligosaccharides. Xylooligosaccharides are sugar oligomers made up of xylose units, which appear naturally in food products such as fruit, vegetables, milk and honey. The sweetness of xylobiose is equivalent to 30% that of sucrose, and the sweetness of other xylooligosaccharides is moderate and possess no off-taste. Xylooligosaccharides are stable over a wide range of pH values, particularly in the acidic range, even at the relatively low pH value of the gastric juice and temperatures (up to 100° C.). As food ingredients, xylooligosaccharides have an acceptable odor, and are low-calorie ingredients, allowing their utilization in anti-obesity diets. In food processing, xylooligosaccharides show advantages over inulin in terms of resistance to both acids and heat, allowing their utilization in low-pH juices and carbonated drinks. The health effects of xylooligosaccharides are mainly related to their effects on the gastrointestinal flora. The administration of xylooligosaccharides resulted in increased amounts of *Bifidobacterium* spp., in the gastrointestinal tract, while, contrarily, *Staphylococcus, Escherichia coli* and many *Clostridium* spp. cannot utilize xylooligosaccharides. The present invention discloses the cacao pod husk extract that can be used as a natural source of xylooligosaccharides, suitable for incorporation in food ingredients even in high concentrations, up to 30.0 wt % of the final food product.

The invention is further described by the following non-limiting examples which further illustrate the invention, and are not intended to, nor should they be interpreted to, limit the scope of protection.

EXAMPLES

The present invention will now be further exemplified with reference to the following example(s). The present invention is in no way limited to the following examples, or preferred embodiments stated in the text. On the contrary, disclosed products, methods and applications according to the present invention may be realized in many different ways without departing from the scope of invention.

Example 1

Cacao Pod Husk Extract:

Cacao pod husks with peel (25 kg) were debacterized and opened to remove cacao pulp, placenta and beans. The remaining pod husk was shredded in any disintegrator and dried at 55° C. A standard hammer mill was used to mill the husks to a powder.

Cacao pod husk powder was suspended in 100 kg of water in a batch reactor with stirring. The temperature was increased to 65° C., the pH is set to 6.5 with citric acid and 40 g of trypsin was added. The trypsin treatment was the cacao pod husk powder for 2 hours under continuous mild stirring. Then, the temperature was lowered to 45° C. and 40 g of endo-protease was added. After again 2 hours of reacting while stirring, the temperature is raised again to 67.5° C., the pH to 7.0 with NaOH. 40 g of exopeptidase was added and the cacao pod husk suspension was treated for another 2 hours. Then the mixture was cooled down.

The mixture was subjected to mild soaking in aqueous solution of sodium hydroxide (10.12 kg sodium hydroxide in 135 kg water concentrated from 7.5 wt % dry basis).

The suspension was stirred vigorously and heated to 80° C. not exceeding a temperature increase of 2° C. per minute. The reaction temperature of 80° C. was maintained for 1 h. Following this digestion period the suspension was cooled to 60° C. The obtained material was further washed and drained until pH value was set down to 8 to 9. The steps of washing and filtering were repeated once. The water extracts were separated by centrifuge and collected and raw residual material was further subjected to an acid extraction. Prior to acid extraction, the raw residual material was subjected to refining with a plate refiner and further dispersing the refined raw material. The step of homogenizing the dispersed refined material under high pressure was performed. Raw residual material (solid) and liquids were further separated by means of pressure filtration (3 bar variation).

The collected raw residual material was subjected to mild extraction in hot water with added citric acid to adjust a pH value at 2.5 (1:25 (w/v)). The first portion was extracted at a temperature of 95° C., during the 3 h to obtain cacao pod husk water soluble fraction. After the extraction, the phases were separated by centrifuging. The extract (liquid phase is collected with the previous extracts, while the raw residual material was further treated).

Then, the temperature was set at 50° C. and pH 6.5 and 40 g of cellulase, 40 g of β-glucosidase and 40 q of xylanase were added. After another 2 hours, the suspension was heated to 60° C. for 1 hours. After stirring the suspension at high speed for homogenizing, raw residual material (solid) and liquids were further separated by means of pressure filtration (3 bar variation).

Collected water extracts were combined with previously extracted portions, and the excessive amount of solvent was removed by lyophilisation. Resulting dry matter was the cacao pod husk extract of the invention.

Example 2

Composition of Cacao Pod Husk Extract

A measured amount (100 g) of cacao pod husk extract was dried in an oven at 75° C. overnight to analyze the dry matter content. The analysis was repeated 3 times. The preliminary analyses for major constituents showed the following composition of cacao pod husk extract according to the present invention: 15.9±0.2 wt % of moisture, 5.4±0.2 wt % of ash, 26.5±0.1 wt % protein components (peptides), lipids 0.3±0.1 wt % and carbohydrates 51.8±0.3 wt % (soluble fiber 36.5±0.2 wt %, sugars 15.2±0.1 wt %).

Example 3

Extraction of cacao pod husks using mechanically assisted extraction methods.

TABLE 1

The extraction conditions used in water extraction of cacao pod husks. US—Ultra Sound assisted extraction; MICROWAVE—Microwave assisted extraction.

|  | US | MICROWAVE |
|---|---|---|
| Solvent | Water | Water |
| m (matrix) [g] | 20 | 20 |
| V (solvent) [mL] | 300 | 300 |
| Temperature [° C.] | 30 | 80 |
| Time [min] | 15 | 15 |
| Power | 200 W, 24 kHz | 1000 W |

TABLE 2

Composition of the cacao pod husk extract obtained by an ultrasound assisted extraction, under conditions shown in Table 1. Yield of extraction was 23.6 wt %.

| HUSK - US | % per extract | mg/g extract |
|---|---|---|
| Total phenolic content | 11.11 | 111.07 |
| Total carbohydrates content | 34.80 | 348.02 |
| Lipids | 0.08 | 0.80 |
| Water content | 13.01 | / |
| Ash | 27.40 | 273.98 |

TABLE 3

Composition of the cacao pod husk extract obtained by a microwave assisted extraction, under conditions shown in Table 1. Yield of extraction was 20.0 wt %.

| HUSK - US | % per extract | mg/g extract |
|---|---|---|
| Total phenolic content | 11.52 | 115.20 |
| Total carbohydrates content | 30.93 | 309.28 |
| Lipids | 2.70 | 27.00 |
| Water content | 15/32 | / |
| Ash | 28.74 | 287.38 |

Example 4: Extraction of Cacao Pod Husks in the Process of the Invention

Acidic extraction: Milled cocoa pod husk was suspended in 20 g $L^{-1}$ citric acid. In total 9.5 kg cacao pod husks was added to 95 L citric acid for optimal extraction, but also to reduce the viscosity of the liquid. The pH was 3 and the material was stirred for 90 min at 80° C. After cooling to room temperature the material was sieved using a large stainless kitchen sieve. About 36 kg solid (wet) material was obtained. The liquid containing small particles was centrifuged and an additional 7 kg of solid (wet) material was obtained. The enzymatic treatment was performed with the solid material. The liquid stream (pH 3.2) was concentrated by nanofiltration.

Handling of the extract: Nanofiltration and diafiltration were performed with a cut-off at 1 kDa (2×3.25 m2 GE Healthcare UFP-1-C-55 hollow fibre membrane) to concentrate the extraction liquid. The conductivity was at the start 166 µS $cm^{-1}$. Subsequently diafiltration with demiwater removed most of the salts and at the end the conductivity was 120 µS $cm^{-1}$, however, the final volume was reduced to 62 litres. From this material ⅓ was freeze dried directly and ⅔ was used for ethanol precipitation. The ethanol concentration was performed in 63% (v/v) ethanol. The material was centrifuged and the pellet was dried at 30° C. The solid material at the bottom was more brownish/black after drying as the material floating at the top after ethanol precipitation.

The ethanol precipitation yielded a total of 383 gram solid material. The freeze drying resulted in 451 gram solid material.

Enzymatic Treatment of the Solids.

Part of the obtained solid material (7.08 kg) was treated with cellulase (total amount added 200 mL Celluclast 1.5 L) and β-glucosidase (total amount added 1 g) to remove cellulose to obtain arabinoxylan enriched material. The solids were suspended in water and the pH was adjusted with NaOH to pH 4.9-5.0.

Subsequently, the enzymes were added at t=0, and an additional amount was added at t=5 h, together with some additional water. The total reaction was performed for 23 h at 50° C. Hereafter, the suspension was centrifuged and the supernatant was freeze dried.

Composition of the Obtained Extracts of Cacao Pod Husks:

Dry matter and ash content. Dry matter content was gravimetrically determined by heating for 16 h at 105° C. Samples were cooled down in a desiccator till room temperature (RT) and the weight of the samples was determined. Subsequently, the (dried) samples were heated within 4 h from 105° C. to 550° C. and were kept at 550° C. for 4 h. Hereafter the samples were cooled down to 105° C. and stored in a desiccator for cooling down to RT. The weight of the samples was determined to calculate the ash content. For determination of the ash content without carbonates the samples were heated within 4 h from 105° C. to 900° C. and kept at 900° C. for 4 h. The samples were cooled down to 105° C. and stored in a desiccator for cooling down to RT before measuring the weight of the samples. All measurements were performed in triplicate.

Protein determination. The nitrogen content was determined by Kjeldahl (Safi et al., 2017) and a nitrogen-to-protein factor of 6.25 was used.

Carbohydrate analysis. Freeze dried samples were hydrolysed in sulphuric acid to their monomeric moieties according to Seaman et al. (Saeman, Moore, Mitchell & Millett, 1954). The material was hydrolysed for 1 h in 72% (w/w) H2SO4 at 30° C. and subsequently water was added to reach 1 M H2SO4. The mixture was incubated for 3 h at 100° C. After hydrolysis the samples were cooled on ice and briefly centrifuged. The supernatants were diluted and to one mL diluted sample 2.5 μL 0.1% (w/v) bromophenol blue in ethanol was added. The pH was adjusted with barium carbonate till a clear blue color was obtained. The remaining solution was filtrated using a 0.45 μm PFTE filter.

The amount of monomeric sugars was measured by high performance anion exchange chromatography (HPAEC) using an ICS-5000 ion chromatography HPLC system equipped with a CarboPac PA-1 column (2×250 mm) in combination with a CarboPac PA guard column (2×25 mm) and a pulsed electrochemical detector in pulsed amperometric detection mode (Dionex, Sunnyvale, USA). A flow rate of 0.3 mL min$^{-1}$ was used and the column was equilibrated with $H_2O$. Elution was performed as follows: 0-53 min $H_2O$, 53-63 min 150 mM NaOH, 63-63.1 min a gradient from 150 mM to 500 mM NaOH, 63.1-78 min 500 mM NaOH, 78-83 min a gradient from 500 mm NaOH to H2O, 83-100 min $H_2O$. Detection of the monomers was possible after post column addition of 0.5 M sodium hydroxide (0.1 mL min-1). Deoxy galactose was used as internal standard. The column temperature was 17° C. All measurements were performed in duplicate.

The composition of the CPH and the extracts hereof are shown in Table 4. Meaning of abbreviation CPH-cacao pod husks. An indication of the cellulose content can be determined by subtracting the carbohydrate content obtained after the hydrolysis treatment from the pre-treatment and hydrolysis treatment. For this batch it is about 12.8% (w/w) dry matter cellulose. Comparison of the precipitated ethanol samples shows that the amount of carbohydrates is more or less similar. Cellulose is only present in cacao pod husk, the cellulase residue and in the Cellulase extract.

TABLE 4

Content (% w/w) of cocoa pod husks and extracts hereof.

| Sample | Dry matter % (w/w) | Ash 550° C. % (w/w)$^a$ | Ash 900° C. % (w/w)$^a$ | Protein % (w/w)$^a$ | Carbohydrates % (w/w)$^b$ |
|---|---|---|---|---|---|
| CPH | 88.98 ± 0.04 | 11.45 ± 0.41 | 8.36 ± 0.51 | 5.74 ± 0.12 | 29.18 ± 1.64 (15.36 ± 0.15) |
| Pectin-dried | 90.59 ± 0.21 | 14.15 ± 0.07 | 8.92 ± 0.50 | 1.49 ± 0.01 | 20.94 ± 0.52 (21.14 ± 0.77) |
| Pectin precipitated | 90.54 ± 0.12 | 20.02 ± 1.40 | 12.06 ± 0.61 | 0.94 ± 0.07 | 10.21 ± 0.23 (13.93 ± 0.14) |
| Cellulose | 92.67 ± 0.02 | 20.61 ± 0.02 | 13.00 ± 0.53 | 2.22 ± 0.32 | 24.82 ± 0.11 (25.82 ± 1.14)) |
| Cellulose residue | 94.86 ± 0.22 | 5.55 ± 0.15 | 3.63 ± 0.58 | 9.10 ± 0.38 | 37.33 ± 0.64 (15.23 ± 0.64) |

$^a$Based on dry matter content.
$^b$In between brackets the values obtained after only 1M H2SO4 hydrolysis. Cellulose is not determined here.

The amount of carbohydrates (carbohydrate composition) on % (w/w) dry matter are shown in Tables 5-7.

TABLE 5

Carbohydrate[a] composition of cocoa pod husks and extracts hereof after 1M $H_2SO_4$ hydrolysis (% w/w dry matter).

| Sample | Fuc | Ara | Rha | Gal | Glc | Xyl | Man | GlcNac | GalA | GLCA |
|---|---|---|---|---|---|---|---|---|---|---|
| CPH | 0.2 | 1.7 | 0.1 | 2.8 | 2.8 | 4.0 | 1.0 | 0.3 | 1.4 | 0.4 |
| Pectin-dried | 0.0 | 0.1 | 2.9 | 5.9 | 1.6 | 0.2 | 1.4 | 0.0 | 7.7 | 1.2 |
| Pectin precipitated | 0.0 | 0.1 | 1.6 | 2.8 | 2.8 | 0.3 | 0.9 | 0.5 | 4.3 | 0.7 |
| Cellulose | 0.2 | 0.2 | 1.1 | 2.7 | 14.6 | 1.7 | 2.3 | 0.0 | 2.9 | 0.5 |
| Cellulose residue | 0.2 | 0.3 | 0.7 | 1.8 | 3.1 | 7.0 | 1.2 | 0.0 | 0.8 | 0.4 |

[a] Fuc is fucose, Ara is arabinose, Rha is rhamnose, Gal is galactose, Glc is glucose, Xyl is xylose, Man is mannose, GlcNac is N-acetyl glucosamine, GalA is galacturonic acid and GlcA is glucuronic acid.

TABLE 6

Carbohydrate[a] composition of cocoa pod husks and extracts hereof after pre-treatment and 1M $H_2SO_4$ hydrolysis (% w/w dry matter).

| Sample | Fuc | Ara | Rha | Gal | Glc | Xyl | Man | GlcNac | GalA | GLCA |
|---|---|---|---|---|---|---|---|---|---|---|
| CPH | 0.1 | 1.6 | 0.1 | 2.9 | 14.0 | 3.9 | 1.7 | 0.3 | 1.5 | 0.0 |
| Pectin-dried | 0.0 | 0.2 | 3.2 | 6.2 | 1.6 | 0.3 | 1.5 | 0.0 | 7.2 | 1.2 |
| Pectin precipitated | 0.0 | 0.6 | 0.6 | 2.5 | 2.0 | 0.2 | 0.3 | 0.0 | 4.1 | 0.0 |
| Cellulose | 0.0 | 1.1 | 0.3 | 2.5 | 14.0 | 1.6 | 1.7 | 0.0 | 3.7 | 0.0 |
| Cellulose residue | 0.0 | 2.5 | 0.0 | 2.2 | 24.2 | 4.8 | 2.0 | 0.0 | 1.5 | 0.0 |

[a] Fuc is fucose, Ara is arabinose, Rha is rhamnose, Gal is galactose, Glc is glucose, Xyl is xylose, Man is mannose, GlcNac is N-acetyl glucosamine, GalA is galacturonic acid and GlcA is glucuronic acid.

Example 5

Dietary Fiber Rich Cacao Drink Made with the Cacao Pod Husk Extract

The amount of 5 kg of the cacao pod husk extract obtained in Example 1 was mixed with 3 kg of cacao powder (10 to 12 wt % fat) and 22 kg fine sugar, and 365 l of skimmed milk. The mixture was stirred and a homogenizer was used for homogenization at 150 kgf/cm2 and sterilized (121° C. for 30 minutes). The obtained drink was divided into portions of 500 ml each, and stored in sealed containers prior to consumption. The final product was evaluated by panelists (15) together with regular chocolate milk (Cecemel, Campina). Panelist evaluated the obtained dietary fiber rich cacao drink as a very pleasant taste beverage, which is different from the regular chocolate milk for its milder and more refreshing cacao taste, and somewhat reduced sweetness.

Example 6

A Yogurt Beverage Containing the Cacao Pod Husk Extract

The cacao pod husk extract as obtained in Example 1 was used to confirm protein dispersion stabilization at pH 4.5 in the acidic milk beverage (yoghurt) and as a reference the stabilizer was replaced with commercially available apple pectin.

After mixing 20 parts of a 10% stabilizing solution containing either cacao pod husk extract or 1% commercially available apple pectin, 10 parts of a 35% sugar solution and 20 parts of an 8% powdered skimmed milk solution while cooling, a 50% citric acid solution was added dropwise to adjust the pH to 5.0, and a homogenizer was used for homogenization at 150 kgf/cm2 to prepare an acidic milk beverage. The yoghurt samples containing the cacao pod husk extract as the stabilizer were confirmed to exhibit protein dispersion stabilization in the full acidic pH range above pH 4.5, which is the isoelectric point of milk protein. In addition, the viscosities of the yogurt were high and the beverages had a full body texture.

The acidic milk beverages containing apple-derived commercially available pectin as the stabilizer exhibited absolutely no protein dispersion stabilization in the acidic pH range above pH 4.5, which is the isoelectric point of milk protein. The viscosity was high and the texture was lumpy and gelatinous, differing substantially from the products prepared using the cacao pod husk extract of the invention. The yoghurt drink comprising the cacao pod husk extract of the invention was stable, without visible aggregation or dividing of phases, preventing any kind of liquid collection on the top of the yoghurt surface. Yogurt was thick and spoonable rather than tender and pourable, and the taste was sweetish, mild and pleasant.

Example 7

A Milk Beverage with the Cacao Pod Husk Extract of the Invention as the Cacao Bean Powder Replacement The cacao pod husk extract obtained in Example 1 was used to prepare chocolate beverage. As a control beverage, a beverage containing no reduced quantity of cacao bean powder was made.

Specifically, 5 kg of water was mixed with 0.5 kg of the cacao pod husk extract of the invention, 0.2 kg of cacao bean powder and 0.5 kg of skimmed milk powder. As a control beverage, 5 kg of water was mixed 0.5 kg of cacao bean powder, 0.7 kg of sugar and 0.5 kg of skimmed milk powder and 0.1 of suitable stabilizer (lecithin). Both mixtures were heated to 80° C. while stirring with a homomixer for pre-emulsification, after which it was homogenized under a pressure of 150 kgf/cm2 using a homogenizer. It was then filled into a bottle and sterilized at 121° C. for 30 minutes to obtain a chocolate beverage. The chocolate beverages obtained were allowed to stand for 1 week at ordinary temperature and to be inspected for their stability. The beverage prepared using cacao pod husk extract of the invention and the control beverage gave satisfactory results, with no precipitation, top separation, aggregation and other signs of phase division observed. The bottles were open and tested by panelists (15). No significant difference in the aroma of the beverages was observed, even though the control beverage was evaluated to have the somewhat sweeter taste by 8 panelists.

Example 8

Dark Chocolate with the Cacao Pod Husk Extract of the Invention

Mixture of 1 kg of cacao pod husk extract of the invention obtained according to Example 5 and 0.5 kg cocoa powder with 2.0 kg of cocoa butter, with 0.5 kg cocoa liquor 2.5 kg white sugar, 1.0 kg whole milk powder and 50 g lecithin was added to a mixing vessel.

In the other vessel 1.0 kg of cacao powder with 2.0 kg of cacao butter, 1.0 kg cocoa liquor, 3.8 kg of white sugar, 1.0 kg whole milk powder and 50 g lecithin was mixed. Listed ingredients of both chocolate mixtures were added to a mixing vessel and were stirred under moderate shear to produce a homogenous mixture.

The resulting fine powder was transferred to a conching apparatus and then treated like customary chocolate. The both resulting chocolate samples are tempered and molded in the devices for normal chocolate.

Both chocolate end products obtained by the present invention were of a very pleasant taste and quality (15 panelists). The difference in sweetness was not observed by 12 of the 15 panelists, even though chocolate comprising cacao pod husk extract of the invention had a reduced sugar content.

Furthermore, adding the cacao pod husk extract of the invention allows reduction of sugar content, or reduction of other ingredients concentrations, with purposes of nutritional and/or functionality improvement of the chocolate, and/or cost saving.

It is believed that the present invention is not limited to the embodiments described above and that some modifications or changes may be added to the examples described without revaluing the appended claims.

The invention claimed is:

1. A method for optimizing the full utilization of cacao pod husks comprising the steps of debacterizing the pod surface and opening cacao pods, separating the cacao pod husks from cacao pulp, cacao placenta, cacao beans and cacao bean hulls, and drying separated cacao pod husks wherein separated and dried cacao pod husks are further processed by a method comprising the steps of
   a) grinding the cacao pod husks;
   b) optional acid extraction;
   c) a first enzymatic treatment;
   d) alkaline solubilization;
   e) a first decantation with centrifuge;
   f) ultrafiltration;
   g) acid extraction;
   h) a second decantation with centrifuge;
   i) a second enzymatic treatment;
   j) ultrafiltration and extract purification;
   k) concentration of the extract;
   l) Drying of the concentrated extract;
   wherein steps a) through l) are performed in order.

2. A method according to claim 1, wherein the total utilization yield is higher than 80 wt % calculated on a dried cacao pod husk weight.

3. A method according to claim 1, wherein the insoluble remaining product is further processed by a method comprising steps of debacterization and alkalization.

4. A method according to claim 1, wherein said (c) first enzymatic treatment comprises a treatment with one or more protein degrading enzymes.

5. A method according to claim 1, wherein said (d) alkaline solubilization comprises the step of treating the cacao pod husks with a suitable base at pH 7.5-11.5 and temperature not exceeding 85° C. for not longer than 2 h.

6. A method according to claim 1, wherein said (g) acid extraction comprises the step of treatment of cacao pod husks at pH 1.5-6.5, at a temperature range of 85° C. to 100° C. for not longer than 4 h.

7. A method according to claim 1, wherein said (i) second enzymatic treatment comprises treatment with an enzyme to lysate polysaccharides.

8. A method according to claim 1, wherein said enzyme is xylanase, cellulase or b-glucanase.

* * * * *